United States Patent
Kim et al.

(10) Patent No.: US 8,435,660 B2
(45) Date of Patent: May 7, 2013

(54) RECHARGEABLE BATTERY AND MODULE THEREOF

(75) Inventors: Yong-Sam Kim, Suwon-si (KR); Hyo-Seob Kim, Suwon-si (KR)

(73) Assignees: Samsung SDI Co., Ltd., Yongin-si, Gyeonggi-do (KR); Robert Bosch GmbH, Stuttgart (DE)

( * ) Notice: Subject to any disclaimer, the term of this patent is extended or adjusted under 35 U.S.C. 154(b) by 368 days.

(21) Appl. No.: 12/801,264

(22) Filed: Jun. 1, 2010

(65) Prior Publication Data

US 2010/0323234 A1  Dec. 23, 2010

(30) Foreign Application Priority Data

Jun. 23, 2009 (KR) .................. 10-2009-0056161

(51) Int. Cl.
*H01M 2/12*  (2006.01)
(52) U.S. Cl.
USPC ................................. 429/61; 429/7; 429/56
(58) Field of Classification Search ............ 429/61, 429/7
See application file for complete search history.

(56) References Cited

U.S. PATENT DOCUMENTS

| 6,730,430 B2 * | 5/2004 | Chang | 429/53 |
|---|---|---|---|
| 7,186,477 B2 * | 3/2007 | Lei | 429/56 |
| 7,781,088 B2 | 8/2010 | Yamauchi et al. | |
| 8,012,615 B2 * | 9/2011 | Onnerud et al. | 429/7 |
| 8,057,928 B2 * | 11/2011 | Kohn et al. | 429/7 |
| 2007/0154783 A1 * | 7/2007 | Jeon | 429/61 |
| 2008/0008928 A1 * | 1/2008 | Partin et al. | 429/61 |

FOREIGN PATENT DOCUMENTS

| JP | 08-031450 A | 2/1996 |
| JP | 11-204094 A | 7/1999 |
| JP | 2008-66254 A | 3/2008 |
| KR | 2002-0021888 A | 3/2002 |
| KR | 10-2009-0034923 A | 4/2009 |

\* cited by examiner

*Primary Examiner* — John S Maples
(74) *Attorney, Agent, or Firm* — Lee & Morse, P.C.

(57) ABSTRACT

A rechargeable battery includes an electrode group in a case, the electrode group including a first electrode and a second electrode, a cap plate coupled to the case, an electrode terminal electrically connected to the first electrode, the electrode terminal being electrically insulated from the cap plate, and a current interrupt device (CID) electrically connected to the second electrode and the cap plate, the CID including a membrane on a first surface of the cap plate, the membrane being between and electrically connecting the second electrode and the cap plate, and the membrane being configured to interrupt the electrical connection when a voltage greater than a setting voltage is charged, a first insulator contacting the first surface of the cap plate and at least one surface of the membrane to support the membrane, and a fastening member connecting the cap plate and the first insulator.

20 Claims, 6 Drawing Sheets

RECHARGEABLE BATTERY AND MODULE THEREOF

BACKGROUND

1. Field

The described technology relates to a rechargeable battery and a module thereof. More particularly, the described technology relates to a rechargeable battery and a module thereof that reduce resistance of a current interrupt device and improve durability of a current interrupt device during vibration or impact.

2. Description of the Related Art

A conventional rechargeable battery may include a current interrupt device (CID) that interrupts current upon overcharging. However, because the CID has a complex structure and many parts, it may be difficult to apply a conventional CID, e.g., a CID used in a small battery, to a large square-shaped rechargeable battery that uses a high current, e.g., in a hybrid electric vehicle (HEV).

Further, when a large resistance is formed in the CID, a temperature thereof may increase due to high current. Therefore, it may be difficult to apply the conventional CID to a rechargeable battery for driving a motor requiring a large amount of power.

It is necessary for CIDs that are used for a rechargeable battery for a hybrid electric vehicle (HEV), a plug-in hybrid electric vehicle (PHEV), or an electric vehicle to have strong durability to vibration or impact of the vehicle.

The above information disclosed in this Background section is only for enhancement of understanding of the background of the described technology and therefore it may contain information that does not form the prior art that is already known in this country to a person of ordinary skill in the art.

SUMMARY

Embodiments are therefore directed to a rechargeable battery and a module thereof, which substantially overcome one or more of the problems due to the limitations and disadvantages of the related art.

It is therefore a feature of an embodiment to provide a rechargeable battery and a module thereof having a CID of a simple structure in order to prevent overcharge and secure safety.

It is therefore another feature of an embodiment to provide a rechargeable battery and a module thereof having a CID structure adapted to have reduced resistance, thereby improving durability of the CID during vibration or impact.

At least one of the above and other features and advantages may be realized by providing a rechargeable battery, including a case that houses an electrode group including a first electrode and a second electrode, a cap plate that is coupled to the case, an electrode terminal that is electrically insulated from the cap plate and electrically connected to the first electrode to be protruded to a first surface of the cap plate, and a CID that electrically connects the second electrode and the cap plate and that interrupts an electrical connection when a voltage greater than a setting voltage is charged. The CID may include a membrane that is disposed at a second surface that is formed at an opposite side of the first surface of the cap plate to electrically connect the second electrode and the cap plate, and that interrupts an electrical connection when a voltage greater than a setting voltage is charged, a first insulator that contacts the second surface of the cap plate and at least one surface of the membrane to support the membrane, and a fastening member that fastens the cap plate and the first insulator.

The CID may further include a first middle plate that is disposed at a surface of an opposite side of the cap plate of the first insulator, and that is connected to the second electrode by a lead tab and has a first penetration hole corresponding to the membrane, and the membrane may include a first flange that is disposed between the second surface of the cap plate and the first middle plate, and a first welding part that is convexly formed toward the first middle plate in the first flange to be electrically connected to the first middle plate.

The fastening member may include a first rivet and a second rivet that fasten the cap plate, the first insulator, and the first middle plate.

The membrane may include a first flange that is connected to the second surface of the cap plate, and a first welding part that is convexly formed toward an opposite side of the cap plate in the first flange, and the CID may further include a sub-plate including a second welding part that is electrically connected to the second electrode to be convexly formed toward the membrane, and wherein the first welding part and the second welding part may be welded to each other.

The CID may further include a first middle plate that is disposed at a surface of an opposite side of the cap plate of the first insulator, that is connected to the second electrode by a lead tab, and that includes a first penetration hole corresponding to the membrane, the sub-plate may include a second flange that is integrally formed with the second welding part and that is connected to a surface of an opposite side of the first insulator of the first middle plate, and the second welding part may pass through the first penetration hole and be welded to the first welding part.

The fastening member may include a first rivet and a second rivet that fasten the cap plate, the first insulator, and the first middle plate.

The cap plate may have a second penetration hole corresponding to the first penetration hole.

The membrane may include a fracture part that is inverted into the second penetration hole to function as a vent.

The electrode terminal may be disposed by interposing the second insulator at the second surface of the cap plate at an opposite side of the CID, be connected to a second middle plate that is connected to the first electrode by a lead tab, and be protruded to a terminal hole that is formed in the cap plate to be deformed in the first surface of the cap plate. The electrode terminal may be formed in a hollow structure.

The fastening member may include a first bolt and a second bolt that penetrate through the first insulator and the first middle plate and that are fastened to the cap plate.

The fastening member may include a first welding member and a second welding member that penetrate through the first insulator and the first middle plate and that are welded to the cap plate.

At least one of the above and other features and advantages may also be realized by providing a rechargeable battery module, including unit cells of two or more square-shaped rechargeable batteries that are disposed to be stacked in one direction, and a bus bar that connects the unit cells. Each unit cell may include an electrode terminal that is housed in a case and that is electrically connected to a first electrode of an electrode group including the first electrode and a second electrode and that is electrically insulated from a cap plate covering the case to be protruded to a first surface of the cap plate, and a CID that electrically connects the second electrode and the cap plate and that interrupts an electrical connection when a voltage greater than a setting voltage is charged. The CID may include a membrane that is disposed at a second surface that is formed at an opposite side of the first surface of the cap plate to be electrically connected to the second electrode and that interrupts an electrical connection when a voltage greater than a setting voltage is charged, a first insulator that is disposed at the second surface of the cap plate and at least one surface of the membrane to support the membrane, and a fastening member that fastens the cap plate and the first insulator. The bus bar is welded to the electrode terminal of the unit cell of one side and to the cap plate adjacent to the membrane of the unit cell of the other side.

The CID may include a first middle plate that is disposed at a surface of an opposite side of the cap plate of the first insulator, that is connected to the second electrode by a lead tab, and that includes a first penetration hole corresponding to the membrane, and a sub-plate that is connected at an opposite side of the first insulator of the first middle plate. The membrane may include a first flange that is connected to the second surface of the cap plate and a first welding part that is protruded to an opposite side of the cap plate in the first flange to be electrically connected to the first middle plate, and the sub-plate may include a second flange that is connected to the first middle plate and a second welding part that is protruded toward the first welding part in the second flange, wherein the second welding part may pass through the first penetration hole and be welded to the first welding part.

The cap plate may have a second penetration hole corresponding to the first penetration hole.

The membrane may include a fracture part that is inverted into the second penetration hole to function as a vent.

The bus bar may be welded to cover the second penetration hole at the cap plate side.

The bus bar may have a discharge hole that is formed to correspond to the second penetration hole.

The fastening member may include a first rivet and a second rivet that fasten the cap plate, the first insulator, and the first middle plate, and the bus bar may connect the electrode terminal of the unit cell of one side and the cap plate corresponding to the membrane that is disposed between the first rivet and the second rivet of the unit cell of the other side with a diagonal structure.

BRIEF DESCRIPTION OF THE DRAWINGS

The above and other features and advantages will become more apparent to those of ordinary skill in the art by describing in detail exemplary embodiments with reference to the attached drawings, in which.

DESCRIPTION OF REFERENCE NUMERALS INDICATING PRIMARY ELEMENTS IN THE DRAWINGS

Figure 1:
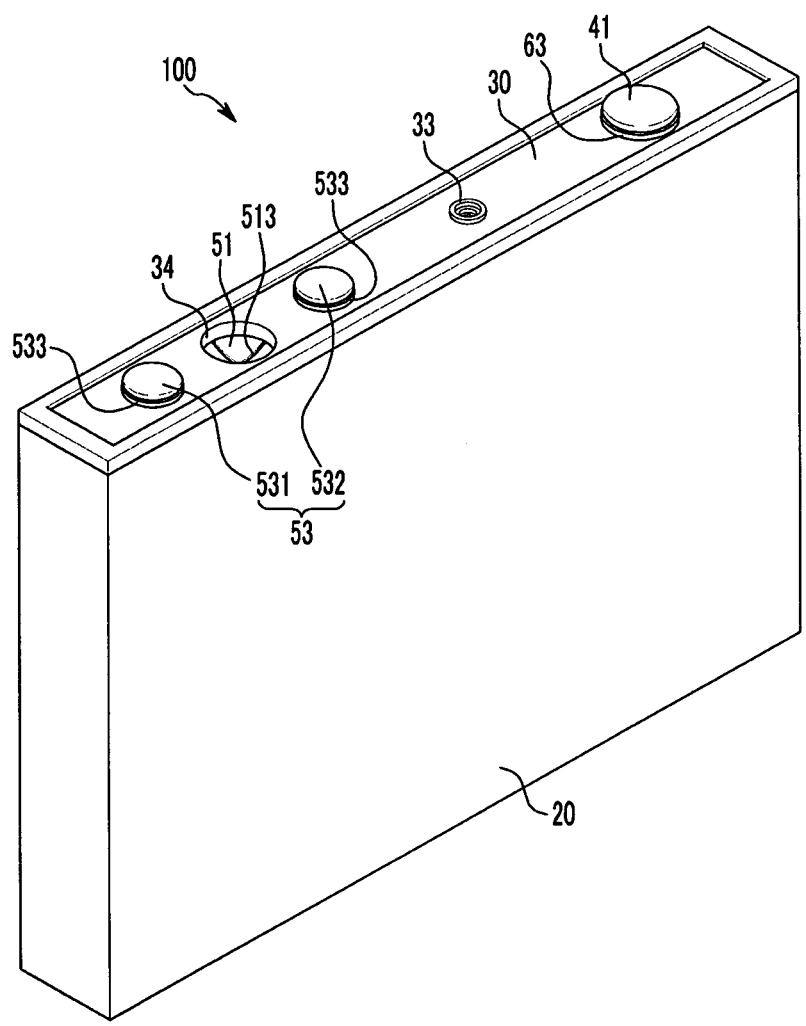
FIG. 1 illustrates a perspective view of a rechargeable battery according to an exemplary embodiment.

| | |
|---|---|
| 100: rechargeable battery | 200, 500, 600: current interrupt device |
| 10: electrode group | 11: positive electrode |
| 111, 121: uncoated part | 12: negative electrode |
| 13: separator | 20: case |
| 30: cap plate | 31: terminal hole |
| 32: electrolyte solution injection hole | |
| 33: seal stopper | 41: electrode terminal |
| 51: membrane | 511, 541: first and second flanges |
| 512, 542: first and second welding parts | |
| 513: fracture part | 52, 152: first insulator |
| 521: penetration hole | |
| 831, 832: first and second welding members | |
| 53, 73, 83: fastening member | 531, 532: first and second rivets |
| 522, 533: insulation member | 54: sub-plate |
| 55, 65: first and second middle plates | |
| 551, 34: first and second penetration holes | |
| 61, 62: lead tab | 731, 732: first and second volts |
| 70: bus bar | 71: discharge hole |
| 63: second insulator | 831, 832: first and second welding members |

DETAILED DESCRIPTION

Korean Patent Application No. 10-2009-0056161, filed on Jun. 23, 2009, in the Korean Intellectual Property Office, and entitled: "Rechargeable Battery and Module Thereof," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. In addition, it will also be understood that when a layer is referred to as being "between" two layers, it can be the only layer between the two layers, or one or more intervening layers may also be present. Like reference numerals refer to like elements throughout.

Figure 2:
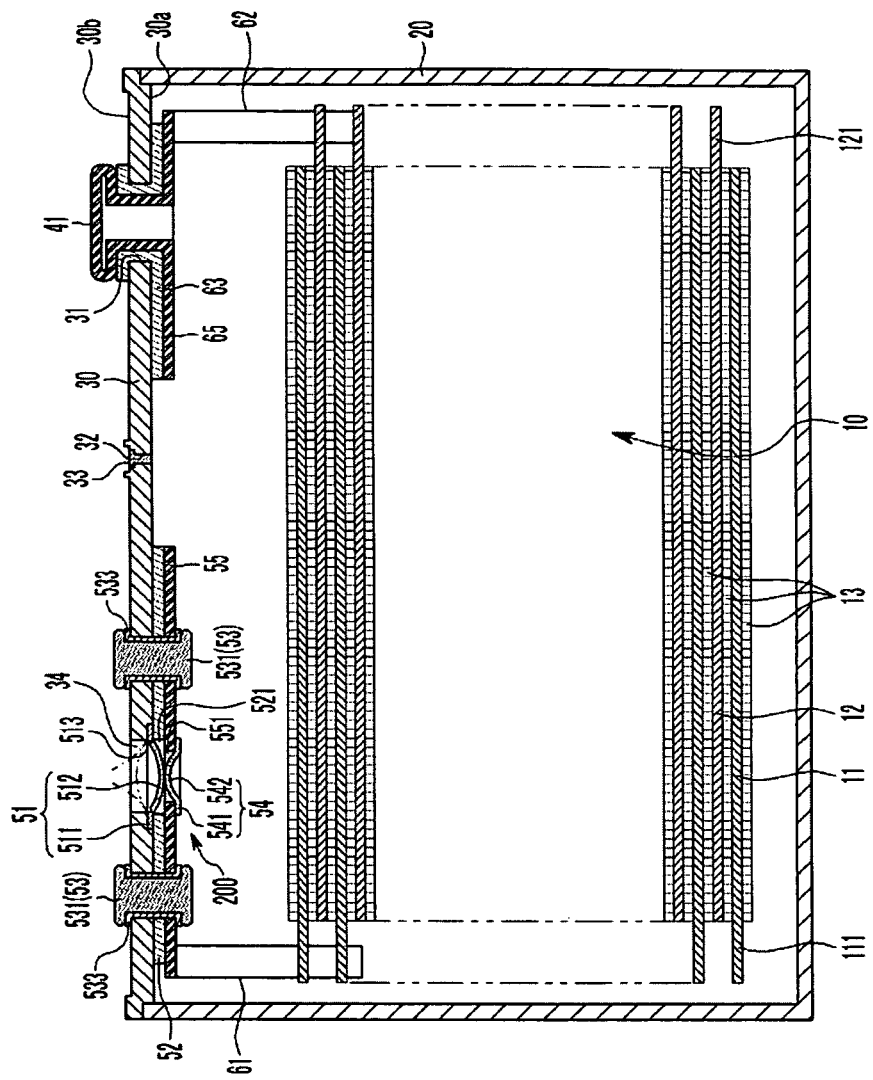
FIG. 2 illustrates a cross-sectional view of the rechargeable battery of FIG. 1.

FIG. 1 illustrates a perspective view of a rechargeable battery according to a first exemplary embodiment, and FIG. 2 illustrates a cross-sectional view of the rechargeable battery of FIG. 1. Referring to FIGS. 1 and 2, a rechargeable battery 100 may include a case 20, e.g., prismoid-shaped, that houses an electrode group 10, a cap plate 30 that closes and seals an opening that is formed at one side of the case 20, an electrode terminal 41 that is protruded to the outside through a terminal hole 31 that is formed in the cap plate 30, and lead tabs 61 and 62 that connect the cap plate 30 and the electrode terminal 41, respectively, to the electrode group 10.

The electrode group 10 may include a first electrode 12, e.g., a negative electrode 12, and a second electrode 11, e.g., a positive electrode 11, respectively disposed at both surfaces of a separator 13, which is an insulator. The positive electrode 11, the negative electrode 12, and the separator 13 may be spirally wound together in a jelly roll form.

The positive electrode 11 and the negative electrode 12 may each be formed with a current collecting body of a thin plate metal foil, and may include a coated part and uncoated parts 111 and 121 that are differentiated according to whether they are coated with an active material. That is, the coated part is an area that is coated with an active material, and the uncoated parts 111 and 121 are areas that are not coated with an active material.

The uncoated parts 111 and 121 may be respectively formed at each side end of a length direction of the positive electrode 11 and the negative electrode 12, respectively, and may be disposed at opposite sides. The uncoated parts 111 and 121 may be connected to the lead tabs 61 and 62, respectively, and the lead tabs 61 and 62 may be connected to the cap plate 30 and the electrode terminal 41, respectively.

In the first exemplary embodiment, because the uncoated part 111 of the positive electrode 11 is connected to the cap plate 30 through the lead tab 61, the cap plate 30 may define a positive electrode terminal. Because the uncoated part 121 of the negative electrode 12 is connected to the electrode terminal 41 through the lead tab 62, the electrode terminal 41 may define a negative electrode terminal. Alternatively, the cap plate 30 may define a negative electrode terminal, and the electrode terminal 41 may define a positive electrode terminal (not shown).

The case 20 may form an entire external appearance of the rechargeable battery 100 and may be formed of a conductive metal, e.g., one or more of aluminum, aluminum alloy, nickel-plated steel, etc. The case 20 may define a housing space for the electrode group 10, e.g., in a rectangular shape of a hexahedron, i.e., a cuboid. If the case 20 is a prismoid, the case 20 may have a wide heat radiating area and, thus, may have a better heat radiating performance, e.g., as compared to that of a cylindrical case.

The cap plate 30 may be formed with a thin plate and may be coupled to an opening that is formed at one side of the case 20 to close and seal the opening. The cap plate 30 may include an electrolyte solution injection hole 32 through which an electrolyte solution may be injected into the sealed case 20. After the electrolyte solution is injected, the electrolyte solution injection hole 32 may be sealed by a seal stopper 33. Further, in order to prevent explosion of the rechargeable battery 100 due to an increase of internal pressure thereof, when the internal pressure of the rechargeable battery 100 reaches a setting value, a vent part (not shown), e.g., included in the cap plate 30, may rupture to discharge internal gas.

In order to secure safety for overcharge, the rechargeable battery 100 according to the first exemplary embodiment may include a current interrupt device (CID) 200. The CID 200 may be between the electrode group 10 and the cap plate 30. For example, as illustrated in FIG. 2, the CID 200 may be between the positive electrode 11 and the cap plate 30. In another example, the CID 200 may be provided between the negative electrode 12 and the electrode terminal 41 (not shown). The CID 200 will be described in more detail below with reference to FIG. 3.

Figure 3:
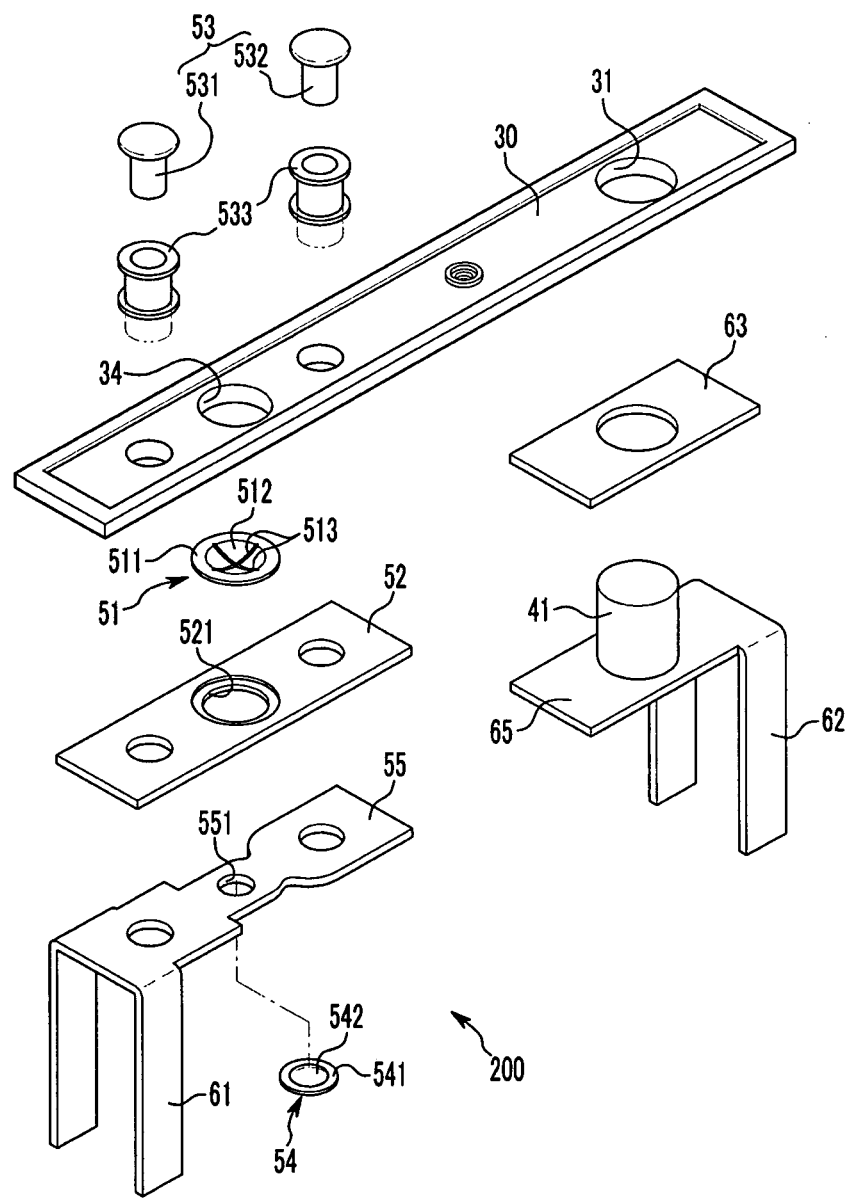
FIG. 3 illustrates an exploded perspective view of members that are fastened to a cap plate in the rechargeable battery of FIG. 1.

FIG. 3 illustrates an exploded perspective view of members that are fastened to the cap plate 30 in the rechargeable battery 100. Referring to FIGS. 2 and 3, the CID 200 may include a membrane 51, a first insulator 52, and a fastening member 53.

As illustrated in FIG. 3, the membrane 51 of the CID 200 may include a first flange 511 and a first welding part 512 attached to the first flange 511. The first flange 511 may be attached, e.g., welded, to a lower surface 30a of the cap plate 30, so the first flange 511 and the lower surface 30a of the cap plate 30 may be in a surface contact state. For example, the first flange 511 may be welded to the cap plate 30 by a laser.

The first welding part 512 may be convexly formed on the first flange 511, e.g., extend downward from the first flange 511, and may be disposed at the lower surface 30a of the cap plate 30. The first welding part 512 may be electrically connected to the positive electrode 11, so current flows through the first welding part 512 to sustain a general operating state of the rechargeable battery 100. Therefore, when the electrical connection between the first welding part 512 and the positive electrode 11 breaks, e.g., upon overcharging, current through the first welding part 512 is interrupted to stop overcharging of the rechargeable battery 100.

The first insulator 52 of the CID 200 may be parallel to a bottom of the case 20, and may be disposed at the lower surface 30a of the cap plate 30 and at a lower surface of the first flange 511. For example, as illustrated in FIG. 2, a first portion of the first insulator 52 may be on, e.g., directly on, the lower surface 30a of the cap plate 30, and a second portion of the first insulator 52 may be on, e.g., directly on, a lower surface of the first flange 511. In other words, as illustrated in FIGS. 2-3, the first flange 511 may be between the cap plate 30 and the second portion of the first insulator 52. As further illustrated in FIG. 2, the lower surface 30a of the cap plate 30 and the lower surface of the first flange 511 may be formed at the same plane, i.e., may be substantially level, so the first insulator 52 may support the first flange 511 of the membrane 51 by a substantially uniform surface pressure. In other words, the first flange 511 may be securely supported between, e.g., directly between, the cap plate 30 and the first insulator 52 that overlaps the substantially flat surface defined by the lower surfaces of the cap plate 30 and first flange 511.

The fastening member 53 of the CID 200 may be formed as a pair to fasten the cap plate 30 and the first insulator 52 at both sides of the membrane 51. In other words, as illustrated in FIG. 2, the membrane 51 may be between two fastening members 53. Therefore, the membrane 51 may sustain a strong bonding state with the cap plate 30 by the cap plate 30 and the first insulator 52 that receive a fastening force of the fastening member 53.

Further, as illustrated in FIGS. 2 and 3, the CID 200 may include a sub-plate 54 and a first middle plate 55. For example, the sub-plate 54 may include a second flange 541 that is electrically connected to the positive electrode 11, and a second welding part 542 that is convexly formed upward from the second flange 541. The first middle plate 55 may be disposed at a lower surface of the first insulator 52, i.e., the first insulator 52 may be between the cap plate 30 and the first middle plate 55, and may be electrically connected to the positive electrode 11 by the lead tab 61. Further, as illustrated in FIGS. 2-3, the first middle plate 55 may include a first penetration hole 551 at a portion corresponding to the membrane 51. When the CID 200 is operated, i.e., when pressure increases in the battery case 20, the first penetration hole 551 may apply internal pressure to the membrane 51.

When the first middle plate 55 is provided, the second flange 541 of the sub-plate 54 may be welded to a lower surface of the first middle plate 55, i.e., the first middle plate 55 may be between the second flange 541 and the cap plate 30. For example, the second flange 541 may be welded to the first middle plate 55 by ultrasonic waves. The second welding part 542 of the sub-plate 54 may pass through the first penetration hole 551, and may be connected, e.g., welded, to the first welding part 512 of the membrane 51 during the general operating state of the rechargeable battery 100. Therefore, as illustrated in FIG. 2, the positive electrode 11 of the electrode group 10 may be electrically connected to the cap plate 30 via the lead tab 61, the first middle plate 55, the sub-plate 54, and the membrane 51.

As illustrated in FIG. 2, when the first insulator 52 is integrally formed, i.e., as a single uniform member, to overlap the first middle plate 55, the first insulator 52 may have a penetration hole 521 therethrough corresponding to the first penetration hole 551 of the first middle plate 55, thereby allowing the membrane 51 and the sub-plate 54 to be connected. In another example, the first insulator 52 may be independently provided at both sides of a connection part of the membrane 51 and the sub-plate 54, i.e., as two separate portions defining the penetration hole 521, (not shown).

According to exemplary embodiments, since the sub-plate 54 is attached, e.g., welded, in a surface contact state to the first middle plate 55 by the second flange 541, a structure in which the first middle plate 55 supports the sub-plate 54 may be formed. Further, an electrical connection structure of the sub-plate 54 and the first middle plate 55 may be stabilized, and a welding structure of the sub-plate 54 and the membrane 51 may be stably sustained. Accordingly, electrical resistance between the first middle plate 55, the sub-plate 54, and the membrane 51 may be reduced.

The fastening member 53 of the CID 200 may be formed in various structures, and may include first and second rivets 531 and 532, as illustrated in FIGS. 2 and 3. The first and second rivets 531 and 532 may fasten the cap plate 30, the first insulator 52, and the first middle plate 55 at both sides of the membrane 51. Therefore, the membrane 51 may sustain a strong bonding state with the cap plate 30 by the cap plate 30 and the first insulator 52 that receive a fastening force of the fastening member 53. In this case, as illustrated in FIG. 2, the first and second rivets 531 and 532 may be installed by interposing an insulation member 533 that penetrates through the first middle plate 55, the first insulator 52, and the cap plate 30. The insulation member 533 may be integrally formed with the first insulator 52 (not shown) or may be separated from the first insulator 52 (FIG. 3). By a strong fastening force of the first middle plate 55 and the first insulator 52, the membrane 51 and the sub-plate 54 that are welded to the first middle plate 55 may stably sustain a welding structure. Thereby, electrical resistance may be reduced between the sub-plate 54 and the membrane 51.

The cap plate 30 may have a second penetration hole 34 at a position corresponding to, e.g., overlapping, the first penetration hole 551 and the membrane 51. When the first welding part 512 of the membrane 51 is separated from the second welding part 542 of the sub-plate 54 due to overcharge, the second penetration hole 34 may facilitate an upward air flow, i.e., relative to the lower surface 30a of the cap plate 30 (two-point chain line in FIG. 2), at an upper surface of the membrane 51. Therefore, a rising separation operation of the membrane 51 may be undisturbed. When the sub-plate 54 is fractured, an electrical connection between the sub-plate 54 and the cap plate 30 is interrupted.

Further, as illustrated in FIGS. 2 and 3, the membrane 51 may include a fracture part 513. In detail, although the rechargeable battery 100 may have a separate vent part (not shown), the rechargeable battery 100 may include a vent part in the CID 200, e.g., the rechargeable battery 100 may include only the vent part in the CID 200 without the separate vent part.

That is, the vent part may be formed in the membrane 51, i.e., the fracture part 513. In more detail, referring again to FIGS. 2 and 3, when the membrane 51 is applied with internal pressure due to a fracture of the sub-plate 54, the membrane 51 may rupture via the fracture part 513 while being inverted into the second penetration hole 34 (one-point chain line of FIG. 2). Thus, gas may be discharged out of the rechargeable battery 100 to the outside, thereby preventing explosion of the rechargeable battery 100 due to an increase of internal pressure.

Referring back to FIG. 2, the electrode terminal 41 may have a structure that is protruded to the outside through the terminal hole 31, and may be formed at an opposite side of the cap plate 30 with respect to the CID 200. A second insulator 63 may be interposed on the lower surface 30a of the cap plate 30, and may extend in the terminal hole 31 between the cap plate 30 and the electrode terminal 41 to electrically insulate the electrode terminal 41 from the cap plate 30. A second middle plate 65 may be disposed on the lower surface 30a of the cap plate 30, i.e., the second insulator 63 may be between the second middle plate 65 and the lower surface 30a of the cap plate 30, and may be connected to the negative electrode 12 by the lead tab 62.

As illustrated in FIG. 2, the electrode terminal 41 may be integral with the second middle plate 65. The electrode terminal 41 may extend from the second middle plate 65, may protrude through the terminal hole 31, and may deform at a periphery of the terminal hole 31 of an upper surface 30b of the cap plate 30. For example, the electrode terminal 41 may be formed with a rivet structure. Further, the electrode terminal 41 may be formed in a hollow structure to be easily deformed in the upper surface 30b of the cap plate 30.

Figure 4:
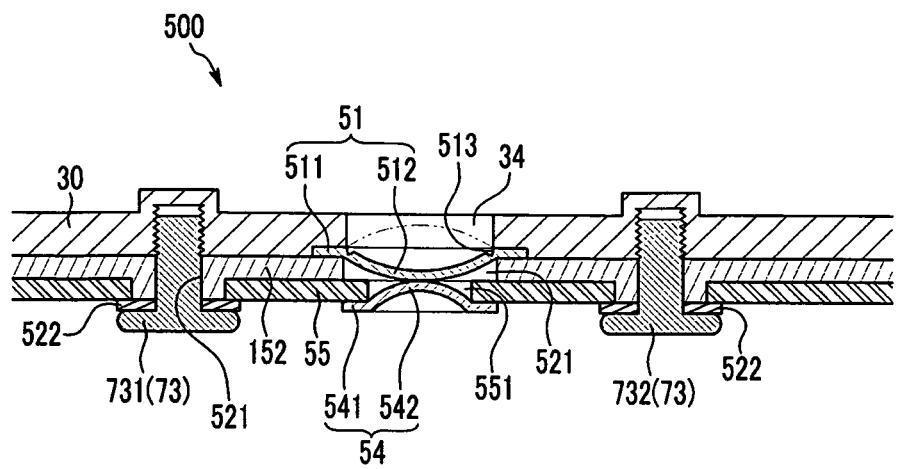
FIG. 4 illustrates a cross-sectional view of a CID according to another exemplary embodiment.

FIG. 4 illustrates a cross-sectional view of a CID 500 according to a second exemplary embodiment. Referring to FIG. 4, the CID 500 may have a substantially same structure as the CID 200 discussed previously with reference to FIGS. 2 and 3, with the exception of having first and second bolts 731 and 732 as a fastening member 73, instead of the first and second rivets 531 and 532 of the fastening member 53.

In detail, as illustrated in FIG. 4, the first and second bolts 731 and 732 may penetrate through the first middle plate 55 and a first insulator 152, and may be coupled to the cap plate 30 by screw threads. In this case, the first insulator 152 may form an electrical insulation structure between the first middle plate 55 and each of the first and second bolts 731 and 732. The first insulator 152 may further include an insulation member 522 that is interposed between head portions of the first and second bolts 731 and 732 and a lower surface of the first middle plate 55.

Figure 5:
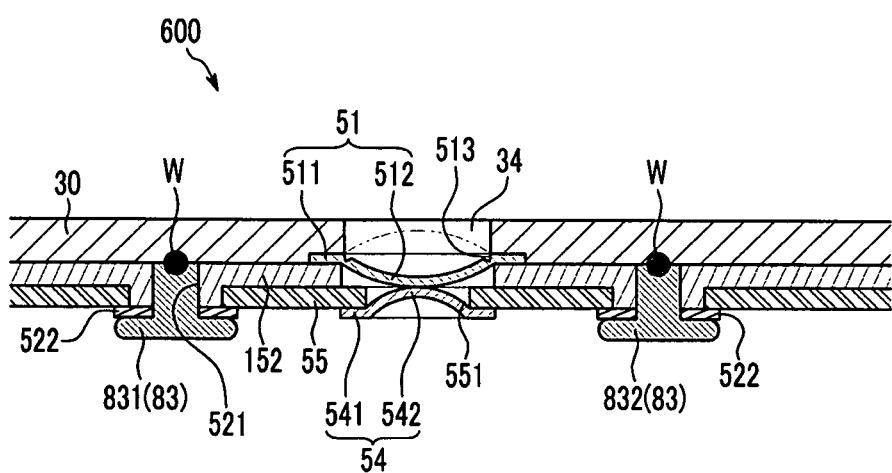
FIG. 5 illustrates a cross-sectional view of a CID according to another exemplary embodiment.

FIG. 5 illustrates a cross-sectional view of a CID 600 according to a third exemplary embodiment. Referring to FIG. 5, the CID 600 may have a substantially same structure as the CID 200 discussed previously with reference to FIGS. 2 and 3, with the exception of having first and second welding members 831 and 832 as a fastening member 83, instead of the first and second rivets 531 and 532 of the fastening member 53.

In detail, as illustrated in FIG. 5, the first and second welding members 831 and 832 may penetrate through the first middle plate 55 and the first insulator 152, and may be welded (W) to the cap plate 30. In this case, the first insulator 152 may form an electrical insulation structure between the first and second welding members 831 and 832 and the first middle plate 55. The first insulator 152 may further include the insulation member 522 that is interposed between head portions of the first and second fastening members 831 and 832 and the lower surface of the first middle plate 55.

Figure 6:
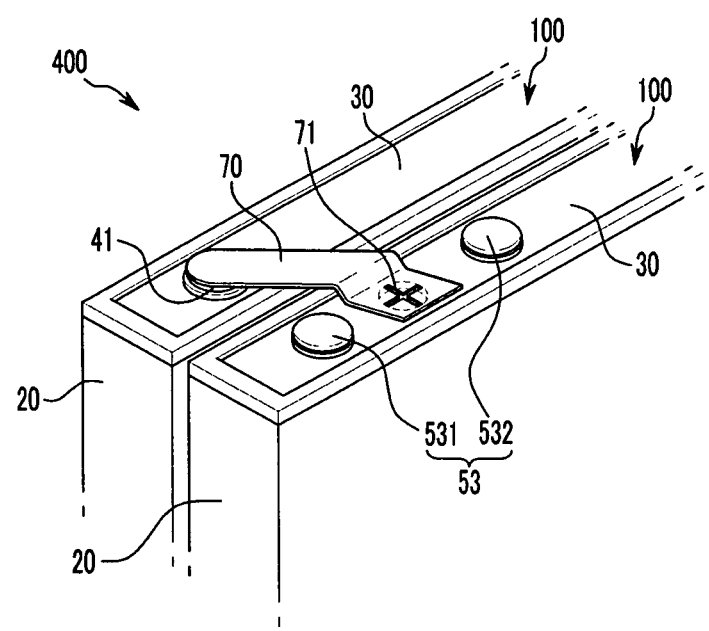
FIG. 6 illustrates a partial perspective view of a state of connecting a cap plate and an electrode terminal of unit cells of a rechargeable battery by a bus bar in a rechargeable battery module according to an exemplary embodiment.
Figure 7:
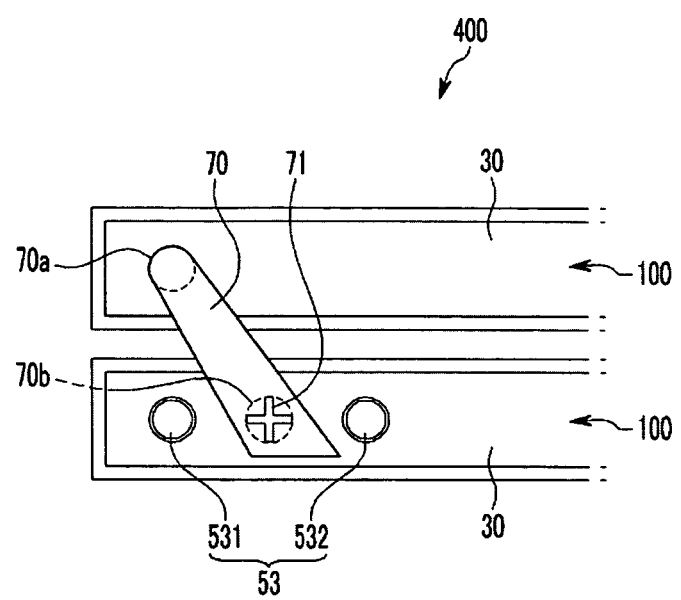
FIG. 7 illustrates a top plan view of FIG. 6.

FIG. 6 illustrates a partial perspective view of a state of connecting the cap plate 30 and the electrode terminal 41 of unit cells by a bus bar in a rechargeable battery module according to an exemplary embodiment, and FIG. 7 illustrates a top plan view of FIG. 6. Referring to FIGS. 6 and 7, a rechargeable battery module 400 may include a plurality of unit cells according to exemplary embodiments, e.g., a plurality of square-shaped rechargeable batteries 100. For example, the rechargeable battery module 400 may be formed by disposing two or more stacked rechargeable batteries 100, i.e., unit cells, in one direction, and connecting the rechargeable batteries 100 of a unit cell in series by a bus bar 70.

For example, as illustrated in FIG. 6, a first side 70a of the bus bar 70 may be welded to the electrode terminal 41 of one rechargeable battery 100 that forms a unit cell and a second side 70b of the bus bar 70 may be welded to the cap plate 30 of another rechargeable battery 100 that forms a unit cell, thereby electrically connecting the electrode terminal 41 and the cap plate 30 of two adjacent rechargeable batteries 100 in series. For example, the bus bar 70 may be made of a low resistance material, e.g., Al and Cu, and may be used when using resistance welding, friction welding, or laser welding.

In order to maximally use an internal space of the case 20, the electrode terminal 41 that is connected to the negative electrode 12 may be formed at one side end of the cap plate 30, and the CID 200 that is connected to the positive electrode 11 may be formed at another side of the cap plate 30. Because of the first rivet 531, even though the CID 200 is disposed at a side end of the cap plate 30, a distance between the CID 200 and a center of the cap plate 30 may be smaller than a distance between the electrode terminal 41 and the center of the cap plate 30.

Further, when the bus bars 70 are connected in series, it is necessary to form a minimal current path between the electrode terminal 41 of the negative electrode 12 and the cap plate 30 of the positive electrode 11. For this purpose, the bus bar 70 may connect the electrode terminal 41 and the CID 200. The CID 200 may be disposed between the first and second rivets 531 and 532. Therefore, the bus bar 70 may be disposed in a diagonal structure between two rechargeable batteries 100 to connect the two rechargeable batteries 100 in series.

The bus bar 70 may be welded in a structure such that it covers a second penetration hole 34 of the cap plate 30 and has a discharge hole 71 that is formed to correspond to the second penetration hole 34 of the cap plate 30. When the membrane 51 of the CID 200 also functions as a vent, the discharge hole 71 may allow internal gas to be discharged upon fracturing of the membrane 51. That is, when the discharge holes 71 are connected in series, a shortest current path may be embodied, and the membrane 51 may function as a vent.

The cap plate 30 that is connected to the positive electrode 11 of the electrode group 10 to form a positive electrode terminal may be planar, and the electrode terminal 41 that is connected to the negative electrode 12 to form a negative electrode terminal may protrude through the cap plate 30. Therefore, in the rechargeable battery module 400, a stable serial connection structure may be formed and sustained.

According to an exemplary embodiment, a rechargeable battery may include CID between an electrode of the electrode group and a cap plate in order to secure safety for overcharge. The CID may include a membrane is welded between the cap plate and another plate, i.e., a first middle plate or a sub-plate that is connected to an electrode of the electrode group, thereby reducing electrical resistance. Further, the membrane in the CID may be disposed and supported between the cap plate and a first insulator that is fastened by a fastening member, thereby improving durability during vibration or impact.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A rechargeable battery, comprising:
    an electrode group in a case, the electrode group including a first electrode and a second electrode;
    a cap plate coupled to the case;
    an electrode terminal electrically connected to the first electrode, the electrode terminal being electrically insulated from the cap plate; and
    a current interrupt device (CID) electrically connected to the second electrode and the cap plate, the CID including:
        a membrane on a first surface of the cap plate, the membrane being between and electrically connecting the second electrode and the cap plate, and the membrane being configured to interrupt the electrical connection when a voltage greater than a setting voltage is charged,
        a first insulator contacting the first surface of the cap plate and at least one surface of the membrane to support the membrane, and
        a fastening member connecting the cap plate and the first insulator.

2. The rechargeable battery as claimed in claim 1, wherein the CID further comprises a first middle plate connected to the second electrode by a lead tab, the first middle plate including a first penetration hole corresponding to the membrane, and the first insulator being between the cap plate and the first middle plate.

3. The rechargeable battery as claimed in claim 2, wherein the membrane includes:
    a first flange between the first surface of the cap plate and the first middle plate; and
    a first welding part extending convexly from the first flange toward the first middle plate, the first welding part being electrically connected to the first middle plate.

4. The rechargeable battery as claimed in claim 3, wherein the fastening member includes a first rivet and a second rivet that fasten the cap plate, the first insulator, and the first middle plate.

5. The rechargeable battery as claimed in claim 3, wherein the fastening member includes a first bolt and a second bolt that penetrate through the first insulator and the first middle plate to be fastened to the cap plate.

6. The rechargeable battery as claimed in claim 3, wherein the fastening member includes a first welding member and a second welding member that penetrate through the first insulator and the first middle plate to be welded to the cap plate.

7. The rechargeable battery as claimed in claim 1, wherein the membrane includes:
    a first flange connected to the first surface of the cap plate; and
    a first welding part extending convexly from the first flange away from the cap plate,
    wherein the CID further comprises a sub-plate including a second welding part electrically connected to the second electrode, the second welding part extending convexly toward the membrane to contact the first welding part.

8. The rechargeable battery as claimed in claim 7, wherein the CID further comprises:
    a first middle plate connected to the second electrode by a lead tab, the first middle plate including a first penetration hole overlapping the membrane, and the first insulator being between the cap plate and the first middle plate, wherein the sub-plate further comprises a second flange integral with the second welding part and connected to a surface of the first middle plate opposite the first insulator, the second welding part passing through the first penetration hole to contact the first welding part.

9. The rechargeable battery as claimed in claim 8, wherein the fastening member includes a first rivet and a second rivet fastening the cap plate, the first insulator, and the first middle plate.

10. The rechargeable battery as claimed in claim 8, wherein the cap plate has a second penetration hole overlapping the first penetration hole.

11. The rechargeable battery as claimed in claim 10, wherein the membrane further comprises a fracture part, the fracture part being configured to rapture and invert into the second penetration hole to function as a vent.

12. The rechargeable battery as claimed in claim 1, wherein the electrode terminal and the CID are on opposite sides of the cap plate, the electrode terminal being connected to the first electrode via a second middle plate and a lead tab and protruding through a terminal hole in the cap plate, and the electrode terminal being insulated form the cap plate via a second insulator.

13. The rechargeable battery as claimed in claim 12, wherein the electrode terminal has a hollow structure and is deformed on a second surface of the cap plate, the second surface being opposite the first surface.

14. A rechargeable battery module, comprising:
   unit cells of two or more rechargeable batteries stacked in one direction, each unit cell including:
      an electrode group in a case, the electrode group including a first electrode and a second electrode;
      a cap plate coupled to the case;
      an electrode terminal electrically connected to the first electrode, the electrode terminal being electrically insulated from the cap plate; and
      a current interrupt device (CID) electrically connected to the second electrode and the cap plate, the CID including:
         a membrane on a first surface of the cap plate, the membrane being between and electrically connecting the second electrode and the cap plate, and the membrane being configured to interrupt the electrical connection when a voltage greater than a setting voltage is charged,
         a first insulator contacting the first surface of the cap plate and at least one surface of the membrane to support the membrane, and
         a fastening member connecting the cap plate and the first insulator; and
      a bus bar connecting the unit cells, the bus bar having a first end connected to an electrode terminal of one unit cell and a second end connected to a cap plate of another unit cell, the second end of the bus bar being adjacent to the membrane of the other unit cell.

15. The rechargeable battery module as claimed in claim 14, wherein the CID further comprises:
   a first middle plate connected to the second electrode by a lead tab, the first middle plate including a first penetration hole corresponding to the membrane, and the first insulator being between the cap plate and the first middle plate; and
   a sub-plate connected to a surface of the first middle plate opposite the first insulator, the sub-plate including a second flange connected to the first middle plate and a second welding part,
   wherein the membrane includes:
      a first flange connected to the first surface of the cap plate; and
      a first welding part protruding from the first flange away from the cap plate, the second welding part of the sub-plate protruding from the second flange, passing through the first penetration hole, and contacting the first welding part.

16. The rechargeable battery module as claimed in claim 15, wherein the cap plate has a second penetration hole corresponding to the first penetration hole.

17. The rechargeable battery module as claimed in claim 16, wherein the membrane further comprises a fracture part configured to invert into the second penetration hole to function as a vent.

18. The rechargeable battery module as claimed in claim 16, wherein the bus bar cover the second penetration hole at the cap plate side.

19. The rechargeable battery module as claimed in claim 18, wherein the bus bar has a discharge hole corresponding to the second penetration hole.

20. The rechargeable battery module as claimed in claim 15, wherein the fastening member includes a first rivet and a second rivet that fasten the cap plate, the first insulator, and the first middle plate, the membrane being between the first rivet and the second rivet, and the bus bar connecting the membrane to an electrode terminal of an adjacent unit cell and being diagonal with respect to the adjacent unit cell.

* * * * *